(12) United States Patent
Xu et al.

(10) Patent No.: US 12,455,495 B2
(45) Date of Patent: Oct. 28, 2025

(54) LENS MODULE AND ELECTRONIC DEVICE

(71) Applicant: Changzhou AAC Raytech Optronics Co., Ltd., Changzhou (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou (CN)

(*) Notice: Subject to any disclaimer, the term of this patent is extended or adjusted under 35 U.S.C. 154(b) by 198 days.

(21) Appl. No.: 18/525,892

(22) Filed: Dec. 1, 2023

(65) Prior Publication Data

US 2024/0337899 A1 Oct. 10, 2024

Related U.S. Application Data

(63) Continuation of application No. PCT/CN2023/086056, filed on Apr. 4, 2023.

(51) Int. Cl.
*H04N 23/55* (2023.01)
*G02B 7/10* (2021.01)
*G02B 27/64* (2006.01)
*G03B 5/00* (2021.01)

(52) U.S. Cl.
CPC ............... *G03B 5/00* (2013.01); *G02B 7/10* (2013.01); *G02B 27/646* (2013.01); *G03B 2205/0069* (2013.01)

(58) Field of Classification Search
CPC ............ H04N 23/55; H04N 23/687; G03B 2205/0007; G03B 2205/0053; G03B 2205/0069; G02B 27/646
USPC .............................................. 348/208.99, 374
See application file for complete search history.

(56) References Cited

U.S. PATENT DOCUMENTS

| | | | | |
|---|---|---|---|---|
| 9,001,224 | B2* | 4/2015 | Moriya | H04N 23/687 |
| | | | | 348/208.99 |
| 12,382,176 | B2* | 8/2025 | Mahmoudzadeh | H04N 23/687 |
| 2016/0170170 | A1* | 6/2016 | Go | G02B 27/646 |
| | | | | 359/557 |
| 2016/0349532 | A1* | 12/2016 | Terajima | G02B 27/646 |
| 2023/0029593 | A1* | 2/2023 | Wang | H04N 23/687 |
| 2024/0094599 | A1* | 3/2024 | Dhanda | G03B 5/00 |
| 2025/0085505 | A1* | 3/2025 | Cho | H04N 23/57 |

* cited by examiner

*Primary Examiner* — Anthony J Daniels
(74) *Attorney, Agent, or Firm* — Wiersch Law Group (57) ABSTRACT

The disclosure relates to a lens module and an electronic device. The lens module includes a frame mechanism and an adjusting mechanism. The anti-shake assembly includes at least one anti-shake coil and at least one anti-shake reset member. The focus assembly includes at least one focus coil and at least one focus reset member. In the lens module of the present embodiment, by arranging the magnet assembly to cooperate with the anti-shake assembly and the focus assembly, the at least one anti-shake coil and the at least one focus coil can share a same magnet assembly to realize the optical anti-shake and auto-focus functions of the lens module, thereby enabling the lens module to have a more compact structure.

20 Claims, 6 Drawing Sheets

LENS MODULE AND ELECTRONIC DEVICE

CROSS REFERENCE TO RELATED APPLICATIONS

The present application is a continuation of PCT Patent Application No. PCT/CN2023/086056, filed Apr. 4, 2023, which is incorporated by reference herein in its entirety.

TECHNICAL FIELD

The various embodiments described in this document relate in general to the technical field of optical systems, and more specifically to a lens module and an electronic device.

BACKGROUND

With the development of camera technologies, lens modules with auto focus (AF) and optical image stabilizer (OIS) have been widely used in electronic devices, such as tablet computers and smart phones.

In the traditional lens module, the AF and OIS function are generally achieved through separate coils and magnets. In practical applications, there is a need to use the combination of multiple coils and multiple magnets in the lens module, which requires a large number of parts, and thus leads to the increase of the volume and weight of the whole module. When applied to electronic devices, the lens module may lead to the increase of the volume of the electronic device. In addition, when multiple parts are installed on the movable members, the overall mass of the movable members may increase, which may directly affect the accuracy and stability of focus and anti-shaking, and directly affect the accuracy and stability of focus and stabilization (anti-shaking), thereby directly affecting the performance of the lens module.

Therefore, it is necessary to miniaturize the lens module on the premise that the functionality of the lens module is ensured.

SUMMARY

The present disclosure provides a lens module and an electronic device for solving the problem of increasing the volume and mass of an existing lens module due to a large number of parts in the lens module, which leads to an increase in the overall volume of the electronic device as well as an impact on the performance of the lens module.

In some embodiments, a lens module is provided. The lens module includes a frame mechanism including a base structure, a support frame, and a lens barrel, where the support frame is suspended in the base structure and defines a movable cavity inside the support frame, and the lens barrel is suspended in the movable cavity; and an adjusting mechanism including a magnet assembly connected to the support frame and disposed at least partially around the movable cavity, an anti-shake assembly, and a focus assembly. The anti-shake assembly includes at least one anti-shake coil and at least one anti-shake reset member, where each respective anti-shake reset member of the at least one anti-shake reset member is connected to the lens barrel and the support frame, and the at least one anti-shake coil is connected to the lens barrel and configured to drive the lens barrel to move relative to the support frame. The focus assembly includes at least one focus coil and at least one focus reset member, where each respective focus reset member of the at least one focus reset member is connected to the support frame and the base structure, and each of the at least one focus coil is connected to the base structure and the at least one focus coil is configured to drive the support frame to move relative to the base structure. The at least one anti-shake coil is disposed on a side of two opposing sides of the magnet assembly and the at least one focus coil is disposed on another side of the two opposing sides of the magnet assembly, and the at least one focus coil is disposed inside the movable cavity.

In some embodiments, the respective anti-shake reset member is electrically connected with a respective anti-shake coil of the at least one anti-shake coil and the support frame, and the respective focus reset member is electrically connected with a respective focus coil of the at least one focus coil and the support frame.

In some embodiments, the respective anti-shake reset member includes a flexible structure connected to the lens barrel and a suspension wire, the suspension wire has one end connected to the flexible structure and has another end connected to the support frame, and the suspension wire is placed on an outer side of the lens barrel and an extension direction of the suspension wire is parallel to an optical axis of the lens barrel.

In some embodiments, the flexible structure includes a first fixing portion, a first connecting portion, and at least one first flexible arm. Each of the at least one first flexible arm is connected to the first fixing portion and the first connecting portion, the first fixing portion is connected to the lens barrel, and the first connecting portion is suspended outside the at least one first flexible arm and connected with the suspension wire; and the at least one first flexible arm is configured as a plurality of first flexible arms, the plurality of first flexible arms are symmetrically arranged relative to the suspension wire, and each of the plurality of the first flexible arms is connected to the first fixing portion and the first connecting portion.

In some embodiments, the lens barrel defines an avoidance hole on an outer wall of the lens barrel, and the avoidance hole is defined around the suspension wire.

In some embodiments, the lens barrel defines a first avoidance groove, the first avoidance groove is defined on a side of the lens barrel facing the flexible structure, and an orthographic projection of the flexible structure on the lens barrel at least partially coincides with the first avoidance groove.

In some embodiments, the respective focus reset member is disposed on a side of the support frame away from the respective anti-shake reset member. The respective focus reset member includes a second fixing portion, a second connecting portion, and a second flexible arm connected with the second fixing portion and the second connecting portion. The second fixing portion is connected with the base structure, and the second connecting portion is connected with the support frame.

In some embodiments, the lens barrel defines at least one second avoidance groove, a respective second avoidance groove of the at least one second avoidance groove is defined on a side of the lens barrel facing the respective focus reset member, and an orthographic projection of the respective focus reset member on the lens barrel at least partially coincides with the respective second avoidance groove.

In some embodiments, the focus assembly further comprises at least one guide structure each movably connected to the base structure and the support frame, and the at least one guide structure is configured to drive the support frame to move in a direction parallel to an optical axis of the lens barrel.

In some embodiments, the base structure defines at least one first guide groove and the support frame defines at least one second guide groove. A respective guide structure of the at least one guide structure includes a guide member and a limiting portion. The guide member is movably disposed between a respective first guide groove of the at least one first guide groove and a second guide groove of the at least one second guide groove, and the limiting portion is disposed at an opening of the respective first guide groove or the respective second guide groove along a moving path of the guide member.

In some embodiments, the guide member includes balls. Each of the balls is in rolling fit with the respective first guide groove and the respective second guide groove.

In some embodiments, the focus assembly further comprises a yoke, the yoke is connected to the base structure, and the yoke and the magnet assembly are magnetically adsorbed to drive the support frame and the base structure to abut on opposite sides of the respective guide structure, respectively.

In some embodiments, the support frame defines two mounting slots, the magnet assembly includes a plurality of magnets, and at least one magnet of the plurality of magnets is disposed in a respective mounting slot of the two mounting slots. The at least one anti-shake coil is magnetically cooperated with the plurality of magnets to drive the lens barrel to move relative to the support frame in a direction perpendicular to an optical axis of the lens barrel, and the at least one focus coil is magnetically cooperated with the plurality of magnets to drive the support frame to move relative to the base structure in a direction parallel to the optical axis.

In some embodiments, the focus assembly further comprises a focus circuit board, and the at least one focus coil is connected to the focus circuit board. The base structure defines an accommodating groove and at least one accommodating hole that are connected with each other. The accommodating groove is defined on an outer wall of the base structure, and the focus circuit board is connected with the base structure and accommodated in the accommodating groove, and the respective focus coil is accommodated in a respective accommodating hole of the at least one accommodating hole.

In some embodiments, an electronic device is provided. The electronic device includes a host device and the lens module described in any embodiment of the disclosure. The lens module is disposed in the host device.

Implementing the technical solution of the disclosure has following technical advantages.

In the lens module of the present embodiment, by enabling the magnet assembly to be cooperated with the anti-shake assembly and the focus assembly, the at least one anti-shake coil and the at least one focus coil can share a same magnet assembly to realize the OIS and AF functions of the lens module, thereby making the lens module have a more compact structure. In addition, compared with the conventional lens module, the mass of movable parts can be reduced by reducing the number of parts, thereby effectively improving the accuracy and stability of anti-shake and focus of the lens module, and also improving the performance of the lens module.

BRIEF DESCRIPTION OF THE DRAWINGS

In order to explain more clearly the embodiments of the disclosure or the technical aspects of the related technologies, the drawings required to be used in the description of the embodiments or related technologies will be briefly described below. It will be obvious that the drawings described below are only some embodiments of the disclosure, and other drawings may be obtained from these drawings without creative effort for those of ordinary skill in the art.

SYMBOL DESCRIPTION

10: lens module
100: frame mechanism; 110: base structure; 111: base body; 1111: receiving cavity; 1112: first guide groove; 1113: accommodating groove: 1114: accommodating hole; 112: base insert; 120: support frame; 121: frame body; 1211: movable cavity: 1212: second guide groove; 1213: mounting slot; 122: frame insert; 123: cover plate; 130: lens barrel; 131: first avoidance groove; 132: avoidance hole; 133: second avoidance groove
200: adjusting mechanism; 210: magnet assembly; 211: first magnet; 212: second magnet; 220: anti-shake assembly; 221: anti-shake coil; 222: anti-shake reset member; 2221: flexible structure; 22211: first fixing portion; 22212: first connecting portion; 22213: first flexible arm; 2222: suspension wire; 223: anti-shake circuit board; 230: focus assembly; 231: focus coil; 232: focus reset member; 2321: second fixing portion; 2322: second connecting portion; 2323: second flexible arm; 233: guide structure; 2331: guide member; 2332: limiting portion; 234: yoke; 235: focus circuit board; 2351: circuit contact 300: shell

DETAILED DESCRIPTION OF THE EMBODIMENTS

In order to make the objects, technical aspects, and advantages of the present disclosure clearer, the technical aspects of the present disclosure will be clearly and completely described below in conjunction with the accompanying drawings therein, and it will be apparent that the described embodiments are part of and not all the embodiments of the present disclosure. Based on the embodiments in the present disclosure, all other embodiments obtained without creative effort by those of ordinary skill in the art fall within the scope of protection of the present disclosure.

Referring to FIGS. 1 to 8, embodiments of the present disclosure provide a lens module 10. The lens module 10 includes a frame mechanism 100 and an adjusting mechanism 200. The frame mechanism 100 includes a base structure 110, a support frame 120 suspended in the base structure 110, and a lens barrel 130. A movable cavity 1211 is defined inside the support frame 120, and the lens barrel 130 is suspended in the movable cavity 1211. The adjusting mechanism 200 includes a magnet assembly 210, an anti-shake assembly 220, and a focus assembly 230. The magnet assembly 210 is connected to the support frame 120 and disposed at least partially around the movable cavity 1211. The anti-shake assembly 220 includes at least one anti-shake coil 221 and at least one anti-shake reset member 222, where each anti-shake reset member 222 is connected to the lens barrel 130 and the support frame 120. The at least one anti-shake coil 221 is connected to the lens barrel 130 and configured to drive the lens barrel 130 to move relative to the support frame 120. The focus assembly 230 includes at least one focus coil 231 and at least one focus reset member 232 each connected to the support frame 120 and the base structure 110. The at least one focus coil 231 is connected to the base structure 110 and configured to drive the support frame 120 to move relative to the base structure 110. The at least one anti-shake coil 221 is disposed on a side of two opposing sides of the magnet assembly 210 and the at least one focus coil 231 is disposed on the other side of the two opposing sides of the magnet assembly 210. The at least one focus coil 231 is located inside the movable cavity 1211.

In the lens module 10 of the present embodiment, by enabling the magnet assembly 210 to be cooperated with the anti-shake assembly 220 and the focus assembly 230, the at least one anti-shake coil 221 and the at least one focus coil 231 can share a same magnet assembly 210 to realize the optical image stabilizer (OIS) and auto focus (AF) functions of the lens module 10, thereby making the lens module 10 have a more compact structure. In addition, compared with the conventional lens module 10, the mass of movable parts can be reduced by reducing the number of parts, thereby effectively improving the accuracy and stability of anti-shake and focus of the lens module 10, and also improving the performance of the lens module 10.

Figure 1:
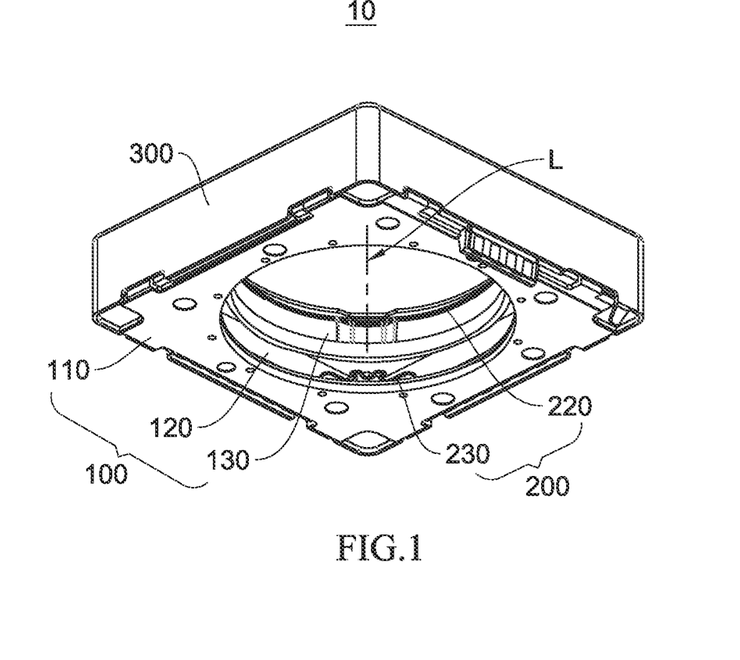
FIG. 1 is a perspective view of a lens module according to an embodiment of the present disclosure.
Figure 2:
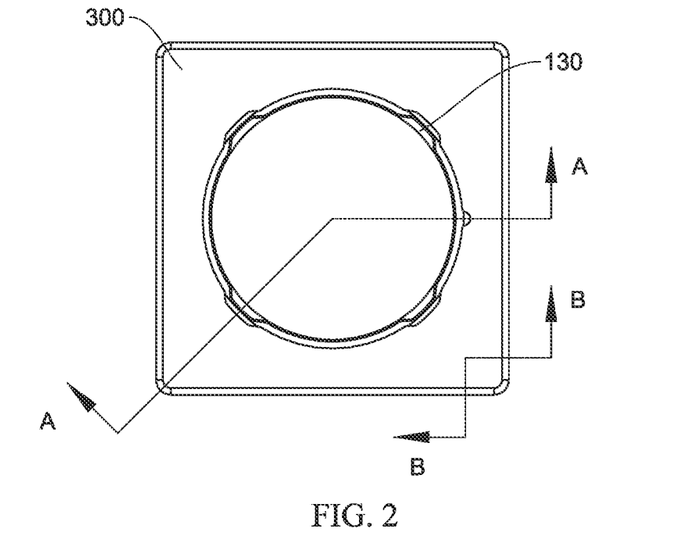
FIG. 2 is a top view of a lens module according to an embodiment of the present disclosure.
Figure 3:
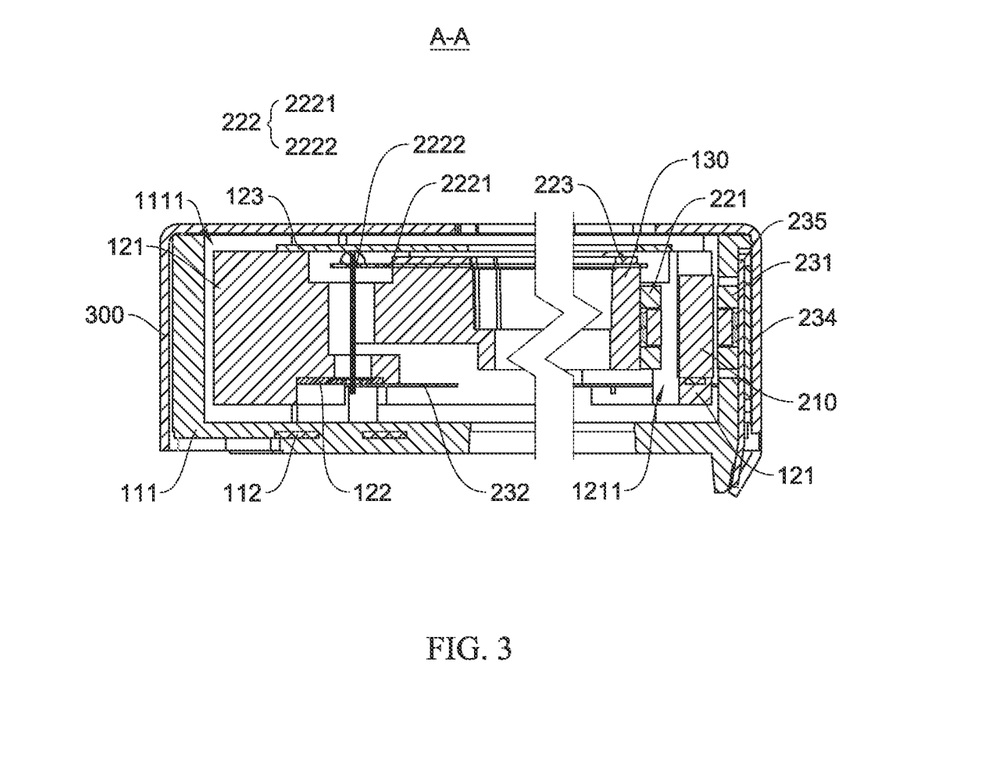
FIG. 3 is a sectional view of the lens module along line A-A in FIG. 2.

Specifically, as shown in FIG. 3, the frame mechanism 100 defines a receiving cavity 1111. The support frame 120 is suspended in the receiving cavity 1111 of the base structure 110. Lenses of the lens module 10 are mounted inside the lens barrel 130, where L in FIG. 1 is defined as an optical axis L of the lens barrel 130, and the optical axis L generally coincides with an optical axis of each of the lenses in the lens barrel 130.

In this embodiment, a respective anti-shake reset member 222 is electrically connected to a respective anti-shake coil 221 and the support frame 120. A respective focus reset member 232 is electrically connected to a respective focus coil 231 and the support frame 120.

With this arrangement, the anti-shake assembly 220 and the focus assembly 230 can be conducted together and are configured to be signally connected with an external component through a focus circuit board 235 of the focus assembly 230 to realize signal transmission and power supply functions. In addition, since the anti-shake assembly 220 and the focus assembly 230 are conducted with the external component through a same circuit, the overall structure of the adjusting mechanism 200 can be made more compact, thereby making the overall structure of the lens module 10 more compact and convenient for arrangement of the lens module in an electronic device.

In some embodiments, the anti-shake assembly 220 includes two anti-shake coils 221 for controlling movement of the lens barrel 130 in an X direction and a Y direction perpendicular to the optical axis L to achieve an OIS anti-shake effect. In addition, the support frame 120 can be driven to move in a direction parallel to the optical axis L by cooperating of the at least one focus coil 231 with the magnet assembly 210. In this case, the respective anti-shake coil 221 of the two anti-shake coils 221 and the respective focus coil 231 can be connected in parallel with each other, which is then electrically with the external circuit through four circuit contacts 2351 on the focus circuit board 235 to achieve the OIS and AF functions simultaneously. In addition, the circuit structure is also more compact.

Referring to FIGS. 3 to 7, in an embodiment, the base structure 110 includes a base body 111 and base inserts 112. The support frame 120 includes a frame body 121 and frame inserts 122. By connecting the base inserts 112 embedded in the base body 111 with the at least one anti-shake reset member 222, and by connecting the frame inserts 122 embedded in the frame body 121 with the at least one anti-shake reset member 222 and the at least one focus reset member 232, the circuit conduction between the anti-shake assembly 220 and the focus assembly 230 can be realized, the overall strength of the base structure 110 and the support frame 120 can be improved, and the overall structure of the base structure 110 and the support frame 120 can be made more compact. In other embodiments, the lead function between the base structure 110 and the support frame 120 may be realized by means of external wiring, laser direct structuring (LDS) technology, and the like, which is not only limited herein.

Figure 5:
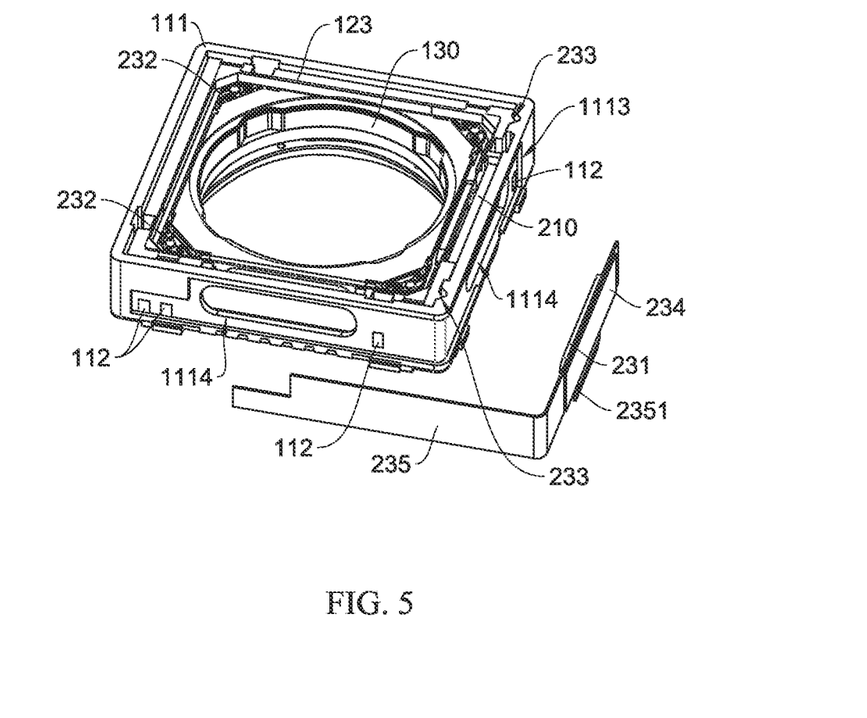
FIG. 5 is a schematic diagram of a combination of partial structures of a lens module according to an embodiment of the present disclosure.
Figure 6:
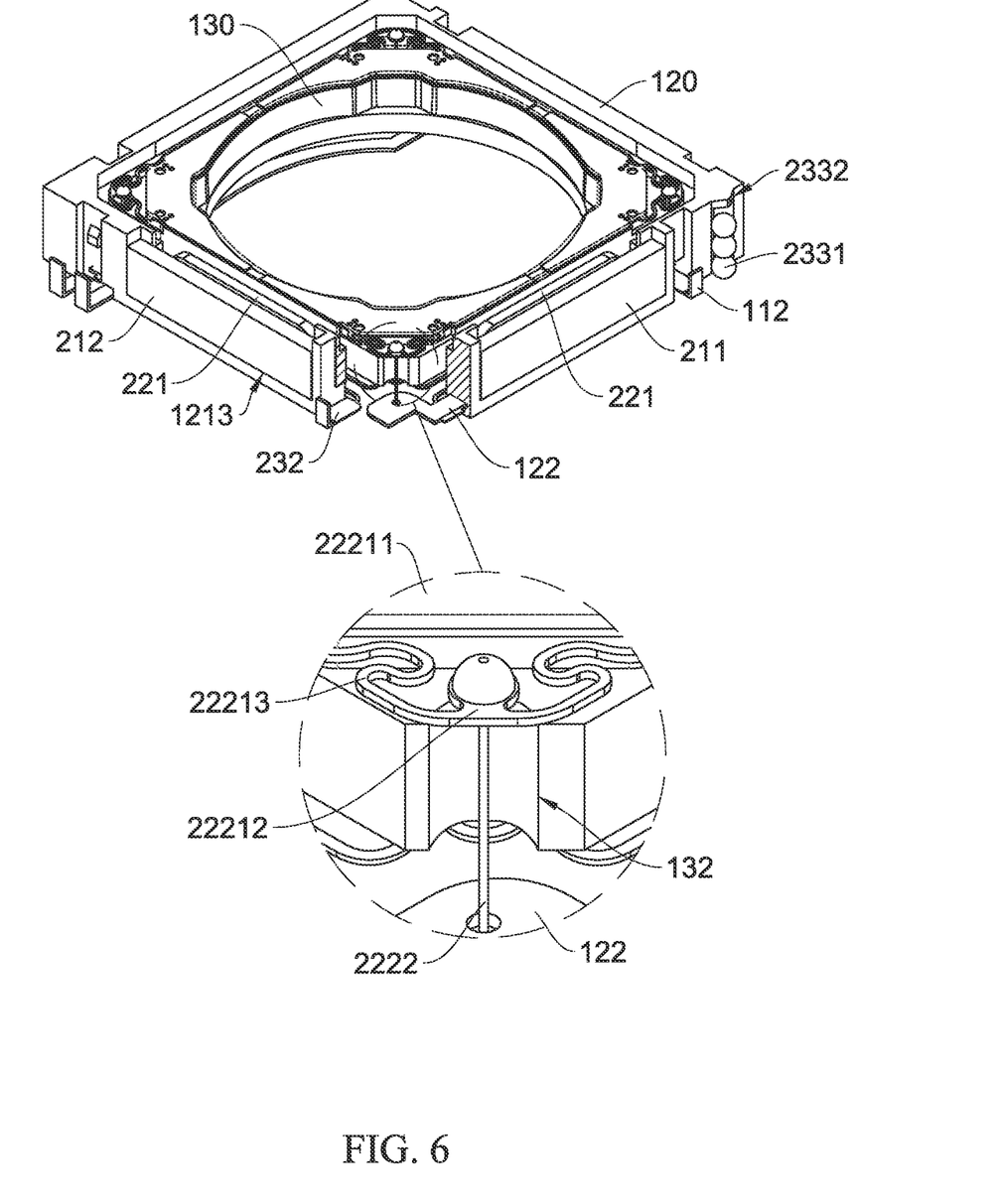
FIG. 6 is a partial sectional view of an internal structure of a lens module according to an embodiment of the present disclosure.

Specifically, as shown in FIGS. 5 and 6, each anti-shake reset member 222 includes a flexible structure 2221 and a suspension wire 2222. The flexible structure 2221 is connected to the lens barrel 130, one end of two opposite ends of the suspension wire 2222 is connected to the flexible structure 2221 and the other end of the two opposite ends of the suspension wire 2222 is connected to the support frame 120. The suspension wire 2222 disposed outside the lens barrel 130 and an extension of the suspension wire 2222 is parallel to the optical axis L of the lens barrel 130.

Since the anti-shake reset member 222 includes the flexible structure 2221 and the suspension wire 2222 connected with the flexible structure 2221, when the lens barrel 130 is driven to move relative to the support frame 120 by the anti-shake coils 221, the flexible structure 2221 can deform and can drive the lens barrel 130 to reset. In addition, since the suspension wire 2222 is connected with the support frame 120, the structure of the anti-shake reset member 222 and the support frame 120 can be made more compact, thereby making the overall structure of the lens module 10 compact.

In this embodiment, the anti-shake assembly 220 further includes an anti-shake circuit board 223. The anti-shake circuit board 223 is preferably a flexible printed circuit (FPC), so that the anti-shake circuit board 223 has a smaller thickness. The anti-shake circuit board 223 is electrically connected to a plurality of anti-shake reset members 222 to realize a lead function and fix the plurality of anti-shake reset members 222.

Referring to FIG. 6, in an embodiment, the flexible structure 2221 includes a first fixing portion 22211, a first connecting portion 22212, and at least one first flexible arm 22213. Each of the at least one first flexible arm 22213 is connected to the first fixing portion 22211 and the first connecting portion 22212. The first fixing portion 22211 is connected to the lens barrel 130. The first connecting portion 22212 is suspended outside the at least one first flexible arm 22213 and connected to the suspension wire 2222. When there are a plurality of first flexible arms 22213, the plurality of first flexible arms 22213 are symmetrically disposed with respect to the suspension wire 2222, and each of the plurality of first flexible arms 22213 is connected to the first fixing portion 22211 and the first connecting portion 22212.

In this embodiment, the end of the suspension wire 2222 is welded and fixed with the first connecting portion 22212. Preferably, a certain amount of solder is covered at a joint between the suspension wire 2222 and the first connecting portion 22212 to improve the fixing firmness between the suspension wire 2222 and the first connecting portion 22212. When the lens barrel 130 moves relative to the support frame 120, the first flexible arm 22213 can deform and store elastic potential energy. When the driving force of the anti-shake coil 221 is removed or the elastic force of the first flexible arm 22213 counteracts the force generated by the shaking of the electronic device, the first flexible arm 22213 can realize the purpose of driving the lens barrel 130 to reset, thereby achieving the anti-shake function. When the plurality of first flexible arms 22213 are connected between the first fixing portion 22211 and the first connecting portion 22212 respectively, the elastic acting force of the first flexible arms 22213 can be increased, thereby improving the reset effect of the flexible structure 2221. As shown in FIG. 6, in the preferred embodiment, an extension path of each first flexible arm 22213 is preferably a curved surrounding structure to improve the deformation range and reset effect of the first flexible arm 22213. Specifically, there may be other numbers of anti-shake reset members 222, for example, may be two anti-shake reset members 222, three anti-shake reset members 222, or four or more anti-shake reset members 222. The plurality of the anti-shake reset members 222 are uniformly disposed along a circumferential direction of the lens barrel 130, and the anti-shake effect and reset stability of the anti-shake assembly 220 can be improved by providing the plurality of anti-shake reset members 222 connected to the lens barrel 130.

In one embodiment, the lens barrel 130 defines at least one avoidance hole 132 on an outer wall of the lens barrel 130, and a respective avoidance hole 132 is defined around a respective suspension wire 2222.

It shall be understood that by defining the avoidance hole 132 to cooperate with the suspension wire 2222, collision between the lens barrel 130 and the suspension wire 2222 in the deformation process can be avoided to improve the durability of the suspension wire 2222. In addition, combined structure of the suspension wire 2222 and the support frame 120 can be made more compact, which is convenient for realizing the miniaturization design requirement of the lens module 10.

Figure 8:
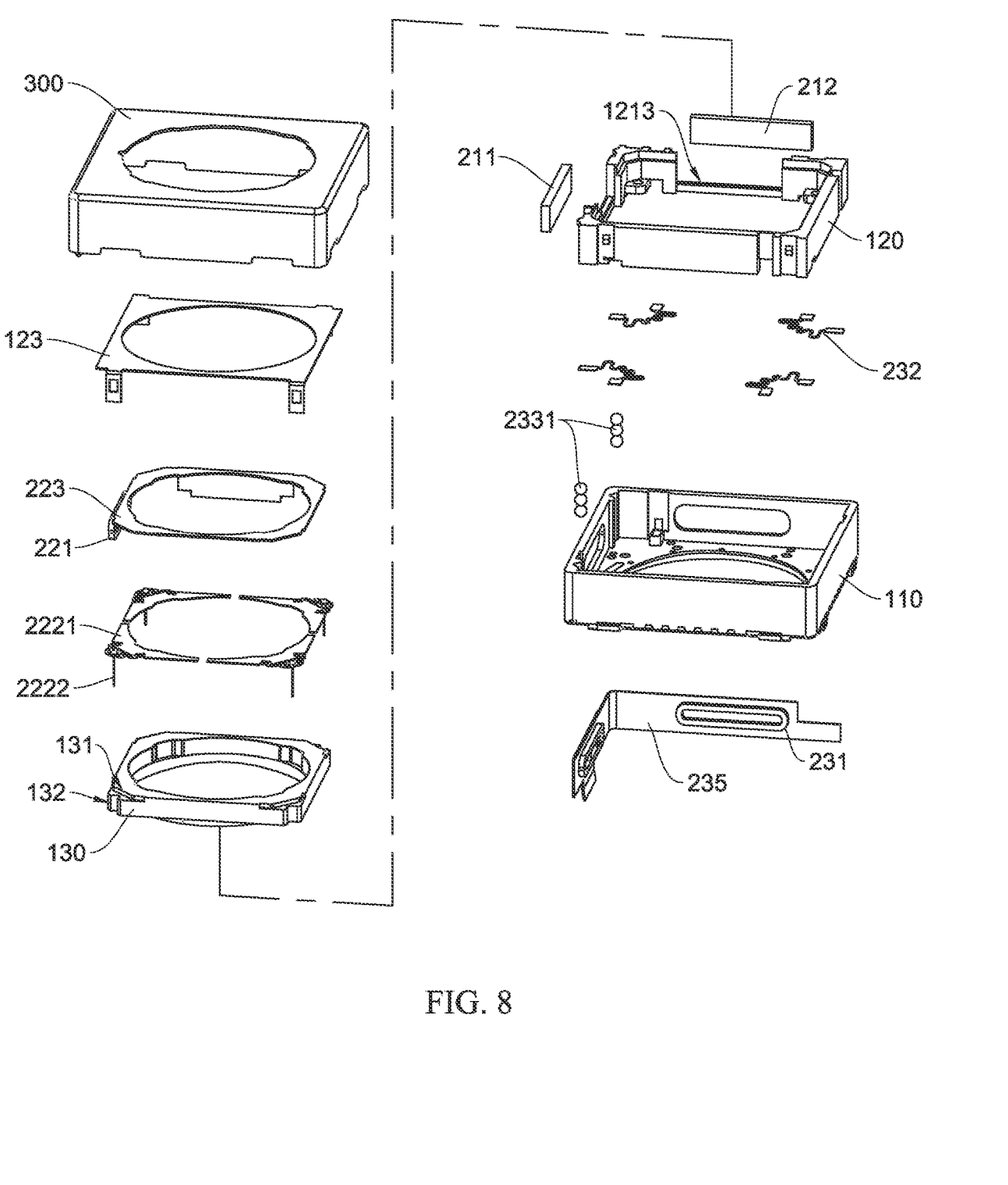
FIG. 8 is an exploded view of a lens module according to an embodiment of the present disclosure.

Furthermore, as shown in FIGS. 5, 6 and 8, the lens barrel 130 defines at least one first avoidance groove 131. Each respective first avoidance groove 131 is defined on a side of the lens barrel 130 facing a respective flexible structure 2221. An orthographic projection of the respective flexible structure 2221 on the lens barrel 130 at least partially coincides with the respective first avoidance groove 131.

In this embodiment, by defining the first avoidance groove 131 on the lens barrel 130 to cooperate with the flexible structure 2221, when the lens barrel 130 moves and deforms relative to the support frame 120, the first avoidance groove 131 can provide an avoidance for the first flexible arm 22213 to avoid collision between the lens barrel 130 and the respective anti-shake reset member 222, thereby improving the durability of the anti-shake reset member 222 and making the structure between the anti-shake reset member 222 and the support frame 120 more compact.

Figure 7:
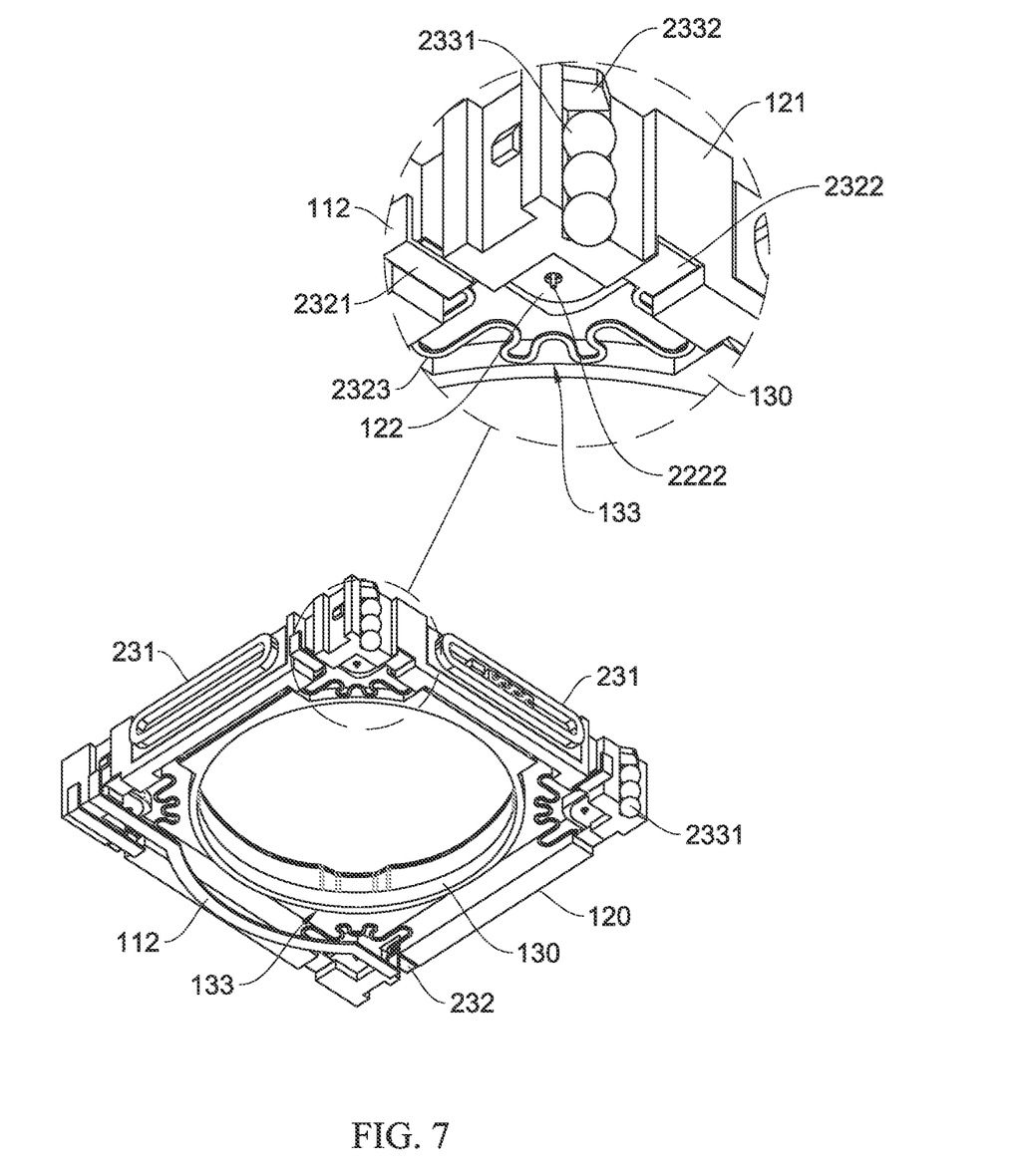
FIG. 7 is a schematic diagram of the internal structure of a lens module according to an embodiment of the present disclosure.

Referring to FIGS. 5 and 7, in one embodiment, the support frame 120 further includes a cover plate 123, and the cover plate 123 is detachably connected to the frame body 121 and is disposed on an upper side of each of the at least one anti-shake reset member 222.

During assembling the lens module 10 of this embodiment, each anti-shake reset member 222 is first connected to the frame body 121 and the lens barrel 130 respectively, and then the cover plate 123 is provided on the upper side of the frame body 121 to cover the opening of the movable cavity 1211, where the cover plate 123 defines a light-entering hole corresponding to the lens barrel 130. With this arrangement, when the cover plate 123 is connected to the frame body 121, the cover plate 123 and the lens barrel 130 are arranged at intervals, so that the cover plate 123 can block objects such as dust, impurities and the like in the external environment, thereby protecting the lens barrel 130 and the anti-shake assembly 220 inside the movable cavity 1211, and thus improving the durability of the lens module 10.

Specifically referring to FIG. 3, FIG. 7, and FIG. 8, a respective focus reset member 232 is provided on a side of the support frame 120 away from a respective anti-shake reset member 222. Each focus reset member 232 includes a second fixing portion 2321, a second flexible arm 2323, and a second connecting portion 2322. The second flexible arm 2323 is connected to the second fixing portion 2321 and the second connecting portion 2322. The second fixing portion 2321 is connected to the base structure 110, and the second connecting portion 2322 is connected to the support frame 120.

In the present embodiment, by providing the at least one focus reset member 232 connected to the support frame 120 and the base structure 110, when the support frame 120 moves relative to the base structure 110, the at least one focus reset member 232 can provide an elastic force to the support frame 120 to drive the support frame 120 to reset, and the lead effect between the base structure 110 and the support frame 120 can also be realized through the at least one focus reset member 232. When the focus reset member 232 is deformed, the second flexible arm 2323 deforms and stores elastic potential energy, and finally drives the second fixing portion 2321 to realize reset movement relative to the second connecting portion 2322 to drive the support frame 120 to reset. Each second fixing portion 2321 is electrically connected to a respective base insert 112 of the base structure 110, and each second connecting portion 2322 is electrically connected to a respective frame insert 122 in the support frame 120.

Further, referring to FIG. 7, the lens barrel 130 defines at least one second avoidance groove 133. Each respective second avoidance groove 133 is defined on a side of the lens barrel 130 facing a respective focus reset member 232. An orthographic projection of the respective focus reset member 232 on the lens barrel 130 at least partially coincides with the respective second avoidance groove 133.

With this arrangement, when the lens barrel 130 moves and deforms relative to the base structure 110, the second avoidance groove 133 can provide an avoidance for the second flexible arm 2323 to avoid collision between the lens barrel 130 and the focus reset member 232, thereby improving the durability of the focus reset member 232 and making the structure between the focus reset member 232 and the lens barrel 130 more compact. Specifically, there may be other numbers of focus reset members 232, such as two focus reset members 232, three focus reset members 232, or four or more focus reset members 232. The plurality of focus reset members 232 are uniformly disposed in the circumferential direction of the support frame 120, and the anti-shake effect and the reset stability of the focus assembly 230 can be improved by providing the plurality of focus reset members 232 connected to the support frame 120.

Figure 4:
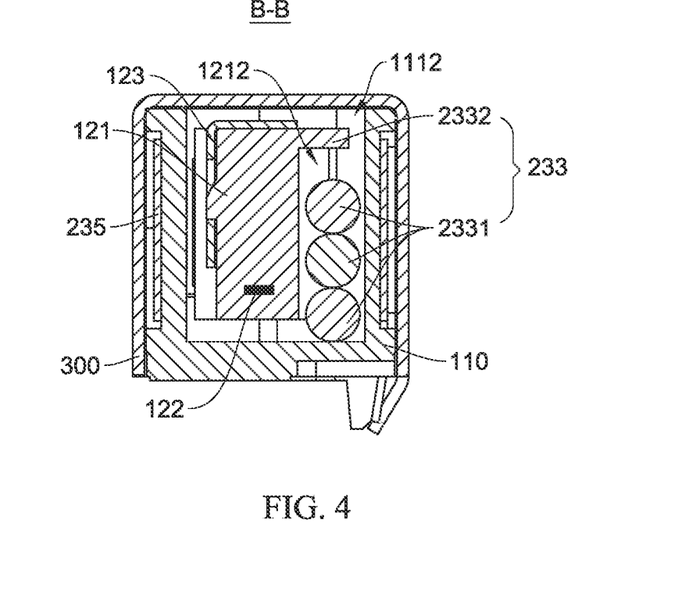
FIG. 4 is a sectional view of the lens module along line B-B in FIG. 2.

Specifically, as shown in FIGS. 4 and 5, the focus assembly 230 further includes at least one guide structure 233. Each of the at least one guide structure 233 is movably connected to the base structure 110 and the support frame 120. The at least one guide structure 233 is configured to drive the support frame 120 to move in the direction parallel to the optical axis L of the lens barrel 130.

In this embodiment, by arranging the guide structure 233 to cooperate with the base structure 110 and the support frame 120, when the focus assembly 230 drives the support frame 120 to move for focus adjustment, the at least one guide structure 233 can limit the movement of the support frame 120 relative to the base structure 110 to ensure the support frame 120 to move in the direction parallel to the optical axis L of the lens barrel 130, and avoid the deviation of the support frame 120 relative to the base structure 110, thereby improving the focus accuracy of the focus assembly 230.

Specifically, as shown in FIGS. 4, 6, and 7, the base structure 110 defines at least one first guide groove 1112, and the support frame 120 defines at least one second guide groove 1212. Each guide structure 233 includes a guide member 2331 movably disposed between a respective first guide groove 1112 and a respective second guide groove 1212 and a limiting portion 2332. The limiting portion 2332 is disposed at an opening of the respective first guide groove 1112 or the respective second guide groove 1212 along a moving path of the respective guide member 2331.

In this embodiment, extension directions of the first guide groove 1112 and the second guide groove 1212 are parallel to the optical axis L, so that the first guide groove 1112 and the second guide groove 1212 cooperate with the guide member 2331 to guide the movement of the guide member 2331, so as to realize the function of limiting the movement of the support frame 120. In addition, the guide member 2331 can be prevented from being rolled out from the first guide groove 1112 and the second guide groove 1212 by providing a limiting portion 2332 at the opening of the first guide groove 1112 or the second guide groove 1212 to limit the movement of the guide member 2331. The limiting portion 2332 can be connected to the base body 111 or the frame body 121, which is not uniquely limited herein.

In one embodiment, the guide member 2331 includes balls. Each of the balls may be in rolling fit with the respective first guide groove 1112 and the respective second guide groove 1212.

Therefore, when the support frame 120 moves relative to the base structure 110, the balls slide relative to the first guide groove 1112 and the second guide groove 1212 to ensure that the support frame 120 moves relative to the base structure 110 in the direction parallel to the optical axis L. In the preferred embodiment, there may be a plurality of balls, and the plurality of balls are arranged sequentially in the direction parallel to the optical axis L and are accommodated between the respective first guide groove 1112 and the respective second guide groove 1212. Specifically, the first guide groove 1112 and the second guide groove 1212 each may be a V-shaped groove, a curved groove, or the like, which are not uniquely limited herein.

In other embodiments, the guide member 2331 may also be a roller. A central axis of the roller is perpendicular to the optical axis L and parallel to a bottom surface of the base structure 110. In this case, there is a need to limit an axial movement of the guide member 2331 via the first guide groove 1112 and the second guide groove 1212. In a preferred embodiment, there may be a plurality of guide structures 233, and each of the plurality of guide structures 233 is connected to the base structure 110 and the support frame 120, to improve the guiding stability and accuracy of the guide structures 233.

Specifically, as shown in FIG. 3, the focus assembly 230 further includes a yoke 234 connected to the base structure 110. The yoke 234 is magnetically adsorbed to the magnet assembly 210 to drive the support frame 120 and the base structure 110 to abut on opposite sides of the guide structure 233, respectively.

In this embodiment, by arranging the yoke 234 to cooperate with the magnet assembly 210, the yoke 234 can be magnetically adsorbed with the magnet assembly 210 to drive the support frame 120 to abut against the guide structure 233 and press the guide structure 233 against the base structure 110, thereby limiting the movement of the support frame 120 relative to the base structure 110 in the direction perpendicular to the optical axis L.

Referring to FIGS. 6 and 8, in one embodiment, the support frame 120 defines two mounting slots 1213 and the magnet assembly 210 includes a plurality of magnets. At least one of the plurality of magnets is provided in a respective mounting slot of the two mounting slots 1213. The anti-shake coils 221 are magnetically cooperated with the magnets to drive the lens barrel 130 to move relative to the support frame 120 in the direction perpendicular to the optical axis L of the lens barrel 130. The focus coils 231 are magnetically cooperated with the magnets to drive the support frame 120 to move relative to the base structure 110 in the direction parallel to the optical axis L.

In this embodiment, the magnet assembly 210 includes a first magnet 211 and a second magnet 212. There are two anti-shake coils 221. The two anti-shake coils 221 are disposed corresponding to the first magnet 211 and the second magnet 212, respectively. With this arrangement, driving forces in the X direction and the Y direction can be provided to the lens barrel 130 in the direction perpendicular to the optical axis L to realize the OIS anti-shake driving function of the anti-shake assembly 220. In an embodiment, as shown in FIGS. 6 and 8, a cross section of the frame body 121 is substantially rectangular, two mounting slots 1213 are respectively defined on two adjacent sides of the frame body 121. The first magnet 211 is disposed in one of the two mounting slots 1213 and the second magnet 212 is disposed in the other of the two mounting slots 1213. In other embodiments, there may be other numbers of magnets in the magnet assembly 210, e.g., three magnets, or four or more magnets, which is depending on the anti-shake drive requirements of the anti-shake assembly 220.

Specifically, referring to FIG. 5 and FIG. 8, the focus assembly 230 further includes the focus circuit board 235. The at least one focus coil 231 is connected to the focus circuit board 235. The base structure 110 defines an accommodating groove 1113 and at least one accommodating hole 1114 which are communicated with each other. The accommodating groove 1113 is defined on an outer wall of the base structure 110. The focus circuit board 235 is connected to the base structure 110 and accommodated in the accommodating groove 1113. The respective focus coil 231 is accommodated in a respective one of the at least one accommodating hole 1114.

With such configuration, during assembling of the lens module 10, the focus circuit board 235 can be mounted into the accommodating groove 1113 and the respective focus coil 231 can be disposed in the respective accommodating hole 1114, so that a more compact combined structure can be formed between the focus circuit board 235 and the base structure 110.

In one embodiment, the focus circuit board 235 has four circuit contacts 2351. Each of the four circuit contacts 2351 is electrically connected with a respective anti-shake reset member 222 of the four anti-shake reset members 222 and a respective focus reset member 232 of the for focus reset members 232 through a respective base insert 112 of the four base inserts 112. In this embodiment, the focus assembly 230 is connected in parallel with an integrated circuit (IC) of each of the two anti-shake coils 221 of and the anti-shake assembly 220 and connected with the four circuit contacts 2351 of the focus circuit board 235. Two of the four circuit contacts 2351 are used for supplying power (VCC) and ground (GND) to the focus circuit board 235, and the other two circuit contacts 2351 are used for transmitting control signals (including but not limited to analog signals and digital signals) to the two anti-shake coils 221 and the focus coil 231. In this case, the focus circuit board 235 can be electrically connected to the external control circuit through the four circuit contacts 2351, such that the overall structure is compact, which facilitates the arrangement of the lens module 10 in the electronic device.

Specifically, the lens module 10 further includes a shell 300. The shell 300 is detachably connected to the frame mechanism 100 and is disposed on the receiving cavity 1111. The shell 300 defines a hole corresponding to the lens barrel 130 to realize the light transmission function.

It shall be understood that by providing the shell 300 to cooperate with the base structure 110, the shell 300 can protect the adjusting mechanism 200 inside the base structure 110 to block objects such as dust, impurities, and the like from the outside.

The disclosure also provides an electronic device. The electronic device includes a host device and the lens module 10 in any one of the above embodiments, where the lens module 10 is arranged in the host device.

It shall be understood that in the electronic device of the present embodiment, by providing the lens module 10 in any one of the above-mentioned embodiments in which the magnet assembly 210 is provided to cooperate with the anti-shake assembly 220 and the focus assembly 230, the anti-shake coil 221 and the focus coil 231 can share a set of magnet assembly 210 to realize the optical anti-shake and auto-focus functions of the lens module 10, thereby enabling the lens module 10 to have a more compact structure and be conveniently arranged in the host device of the electronic device to realize the miniaturization design requirements of the electronic device. Specifically, the electronic device includes, but is not limited to, a tablet computer and a smart phone.

In the description of embodiments of the disclosure, it is to be noted that orientation or positional relationships indicated by the terms "center," "longitudinal," "transverse," "upper," "lower," "front," "rear," "left," "right," "vertical," "horizontal," "top," "bottom," "inner," "outer" and the like are orientation or positional relationships shown in the drawings, which are intended for ease of description and simplification of the embodiment of the disclosure only, and are not intended to indicate or imply that the device or element in question must have a particular orientation, be constructed and operate in a particular orientation and therefore should not be construed as limiting to the embodiment of the disclosure. Furthermore, the terms "first", "second", and "third" are used for descriptive purposes only and should not be understood to indicate or imply relative importance.

In the description of embodiments of the present disclosure, it is to be noted that unless otherwise expressly specified and limited, the terms "connecting/connected" and "coupling" should be understood in a broad sense, for example, they may be fixed connections, detachable connections, or integral connections. Alternatively, they may be understood as mechanical connection or electrical connection; or can be directly connection or indirectly connection through an intermediary. The particular meaning of the above terms in the embodiments of the present disclosure can be understood in particular to those of ordinary skill in the art.

In embodiments of the disclosure, the first feature being "above" or "below" the second feature may be in direct contact with the first feature and the second feature, or the first feature and the second feature may be in indirect contact through an intermediate medium, unless otherwise expressly specified and defined. Moreover, the first feature being "above", "on", and "upper" the second feature may mean that the first feature is directly above or obliquely above the second feature, or simply indicate that the first feature is horizontally higher than the second feature. The first feature is "below", "under", and "beneath" the second feature, may mean that the first feature is directly below or obliquely below the second feature, or simply mean that the horizontal height of the first feature is less than that of the second feature.

In the description of this specification, descriptions of the reference terms "one embodiment," "some embodiments," "example," "specific example," or "some examples," etc. mean that specific features, structures, materials, or features described in connection with the embodiments or examples are included in at least one embodiment or example of an embodiment of the disclosure. In this specification, the schematic formulation of the above terms need not be directed to the same embodiments or examples. Further the specific features, structures, materials, or characters described may be combined in a suitable manner in any one or more embodiments or examples. Furthermore, without contradicting, one another those skilled in the art may combine different embodiments or examples described in this specification and features of different embodiments or examples.

Finally, it is to be noted that the above embodiments are only used to illustrate the technical scheme of the present disclosure, but not to limit it. Although the present disclosure has been described in detail with reference to the foregoing embodiments, it is to be understood by those of ordinary skill in the art that the technical scheme described in the foregoing embodiments can still be modified or some technical features thereof can be equivalently replaced. These modifications or substitutions do not depart the essence of the corresponding technical proposal from the spirit and scope of the technical proposal of the embodiments of the present disclosure.

What is claimed is:
1. A lens module, comprising:
 a frame mechanism including:
  a base structure,
  a support frame, and
  a lens barrel, wherein the support frame is suspended in the base structure and defines a movable cavity inside the support frame and the lens barrel is suspended in the movable cavity; and an adjusting mechanism including:
  a magnet assembly connected to the support frame and disposed at least partially around the movable cavity,
  an anti-shake assembly including at least one anti-shake coil and at least one anti-shake reset member, and
  a focus assembly including at least one focus coil and at least one focus reset member,
  wherein:
    each of the at least one anti-shake reset member is connected to the lens barrel and the support frame,
    the at least one anti-shake coil is connected to the lens barrel and configured to drive the lens barrel to move relative to the support frame,
    each of the at least one focus reset member is connected to the support frame and the base structure,
    each of the at least one focus coil is connected to the base structure,
    the at least one focus coil is configured to drive the support frame to move relative to the base structure,
    the at least one anti-shake coil is disposed on a side of two opposing sides of the magnet assembly,
    the at least one focus coil is disposed on another side of the two opposing sides of the magnet assembly, and
    the at least one focus coil is disposed inside the movable cavity.

2. The lens module of claim 1, wherein an anti-shake reset member of the at least one anti-shake reset member is electrically connected with a respective anti-shake coil of the at least one anti-shake coil and the support frame and a focus reset member of the at least one focus reset member is electrically connected with a respective focus coil of the at least one focus coil and the support frame.

3. The lens module of claim 1, wherein:
  an anti-shake reset member of the at least one anti-shake reset member includes a flexible structure connected to the lens barrel and a suspension wire,
  the suspension wire has one end connected to the flexible structure and has another end connected to the support frame,
  the suspension wire is placed on an outer side of the lens barrel, and
  an extension direction of the suspension wire is parallel to an optical axis of the lens barrel.

4. The lens module of claim 3, wherein the flexible structure includes:
  a first fixing portion,
  a first connecting portion, and
  at least one first flexible arm,
  wherein:
    each of the at least one first flexible arm is connected to the first fixing portion and the first connecting portion,
    the first fixing portion is connected to the lens barrel,
    the first connecting portion is suspended outside the at least one first flexible arm and connected with the suspension wire,
    the at least one first flexible arm is configured as a plurality of first flexible arms,
    the plurality of first flexible arms are symmetrically arranged relative to the suspension wire, and
    each of the plurality of the first flexible arms is connected to the first fixing portion and the first connecting portion.

5. The lens module of claim 3, wherein the lens barrel defines an avoidance hole on an outer wall of the lens barrel and the avoidance hole is defined around the suspension wire.

6. The lens module of claim 3, wherein:
  the lens barrel defines a first avoidance groove,
  the first avoidance groove is defined on a side of the lens barrel facing the flexible structure, and
  an orthographic projection of the flexible structure on the lens barrel at least partially coincides with the first avoidance groove.

7. The lens module of claim 1, wherein a focus reset member of the at least one focus reset member is disposed on a side of the support frame away from an anti-shake reset member of the least one anti-shake reset member and the respective focus reset member of the least one focus reset member includes:
  a second fixing portion,
  a second connecting portion, and
  a second flexible arm connected with the second fixing portion and the second connecting portion,
  wherein the second fixing portion is connected with the base structure and the second connecting portion is connected with the support frame.

8. The lens module of claim 2, wherein:
  the lens barrel defines at least one second avoidance groove,
  a respective second avoidance groove of the at least one second avoidance groove is defined on a side of the lens barrel facing the respective focus reset member, and
  an orthographic projection of the respective focus reset member on the lens barrel at least partially coincides with the respective second avoidance groove.

9. The lens module of claim 1, wherein:
  the focus assembly further comprises at least one guide structure,
  each guide structure of the at least one guide structure is movably connected to the base structure and the support frame, and
  the at least one guide structure is configured to drive the support frame to move in a direction parallel to an optical axis of the lens barrel.

10. The lens module of claim 9, wherein:
  the base structure defines at least one first guide groove and the support frame defines at least one second guide groove,
  a respective guide structure of the at least one guide structure includes a guide member and a limiting portion,
  the guide member is movably disposed between a respective first guide groove of the at least one first guide groove and a respective second guide groove of the at least one second guide groove, and
  the limiting portion is disposed at an opening of the respective first guide groove or the respective second guide groove along a moving path of the guide member.

11. The lens module of claim 10, wherein the guide member includes balls and each of the balls is in rolling fit with the respective first guide groove and the respective second guide groove.

12. The lens module of claim 9, wherein the focus assembly further comprises a yoke connected to the base structure and the yoke and the magnet assembly are magnetically adsorbed to drive the support frame and the base structure to abut on opposite sides of a guide structure of the at least one guide structure.

13. The lens module of claim 1, wherein:
the support frame defines two mounting slots,
the magnet assembly includes a plurality of magnets,
at least one magnet of the plurality of magnets is disposed in a respective mounting slot of the two mounting slots,
the at least one anti-shake coil is magnetically cooperated with the plurality of magnets to drive the lens barrel to move relative to the support frame in a direction perpendicular to an optical axis of the lens barrel, and
the at least one focus coil is magnetically cooperated with the plurality of magnets to drive the support frame to move relative to the base structure in a direction parallel to the optical axis.

14. The lens module of claim 1, wherein:
the focus assembly further comprises a focus circuit board,
the at least one focus coil is connected to the focus circuit board,
the base structure defines an accommodating groove and at least one accommodating hole that are connected with each other,
the accommodating groove is defined on an outer wall of the base structure,
the focus circuit board is connected with the base structure and accommodated in the accommodating groove, and
the respective focus coil is accommodated in a respective accommodating hole of the at least one accommodating hole.

15. An electronic device, comprising:
a host device, and
a lens module disposed in the host device, wherein the lens module includes:
a frame mechanism including:
a base structure,
a support frame, and
a lens barrel,
wherein the support frame is suspended in the base structure and defines a movable cavity inside the support frame and the lens barrel is suspended in the movable cavity; and
an adjusting mechanism including:
a magnet assembly connected to the support frame and disposed at least partially around the movable cavity,
an anti-shake assembly including at least one anti-shake coil and at least one anti-shake reset member, and
a focus assembly including at least one focus coil and at least one focus reset member,
wherein:
each of the at least one anti-shake reset member is connected to the lens barrel and the support frame,
the at least one anti-shake coil is connected to the lens barrel and configured to drive the lens barrel to move relative to the support frame,
each of the at least one focus reset member is connected to the support frame and the base structure,
each of the at least one focus coil is connected to the base structure,
the at least one focus coil is configured to drive the support frame to move relative to the base structure,
the at least one anti-shake coil is disposed on a side of two opposing sides of the magnet assembly,
the at least one focus coil is disposed on another side of the two opposing sides of the magnet assembly, and
the at least one focus coil is disposed inside the movable cavity.

16. The electronic device of claim 15, wherein an anti-shake reset member of the at least one anti-shake reset member is electrically connected with a respective anti-shake coil of the at least one anti-shake coil and the support frame and a focus reset member of the at least one focus reset member is electrically connected with a respective focus coil of the at least one focus coil and the support frame.

17. The electronic device of claim 15, wherein:
an anti-shake reset member of the at least one anti-shake reset member includes a flexible structure connected to the lens barrel and a suspension wire,
the suspension wire has one end connected to the flexible structure and has another end connected to the support frame,
the suspension wire is placed on an outer side of the lens barrel, and
an extension direction of the suspension wire is parallel to an optical axis of the lens barrel.

18. The electronic device of claim 17, wherein the flexible structure includes:
a first fixing portion,
a first connecting portion, and
at least one first flexible arm,
wherein:
each of the at least one first flexible arm is connected to the first fixing portion and the first connecting portion,
the first fixing portion is connected to the lens barrel,
the first connecting portion is suspended outside the at least one first flexible arm and connected with the suspension wire,
the at least one first flexible arm is configured as a plurality of first flexible arms,
the plurality of first flexible arms are symmetrically arranged relative to the suspension wire, and
each of the plurality of the first flexible arms is connected to the first fixing portion and the first connecting portion.

19. The electronic device of claim 17, wherein the lens barrel defines an avoidance hole on an outer wall of the lens barrel and the avoidance hole is defined around the suspension wire.

20. The electronic device of claim 17, wherein:
the lens barrel defines a first avoidance groove,
the first avoidance groove is defined on a side of the lens barrel facing the flexible structure, and
an orthographic projection of the flexible structure on the lens barrel at least partially coincides with the first avoidance groove.

* * * * *